(12) United States Patent
Pott et al.

(10) Patent No.: US 7,021,279 B1
(45) Date of Patent: Apr. 4, 2006

(54) DIRECT INJECTION INTERNAL COMBUSTION ENGINE WITH NOX-REDUCED EMISSIONS

(75) Inventors: Ekkehard Pott, Gifhorn (DE); Rudolf Krebs, Peiner Strasse (DE); Bernd Stiebels, Adenbuttel (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/089,528

(22) PCT Filed: Sep. 27, 2000

(86) PCT No.: PCT/EP00/09440

§ 371 (c)(1),
(2), (4) Date: Jul. 2, 2002

(87) PCT Pub. No.: WO01/25605

PCT Pub. Date: Apr. 12, 2001

(30) Foreign Application Priority Data

Oct. 6, 1999 (DE) .............................. 199 48 298

(51) Int. Cl.
*F02B 31/00* (2006.01)
(52) U.S. Cl. .................. 123/301; 123/305; 123/568.14
(58) Field of Classification Search ................ 123/295, 123/301, 305, 568.12, 568.14
See application file for complete search history.

(56) References Cited

U.S. PATENT DOCUMENTS

| 5,322,043 A | | 6/1994 | Shriner et al. ............... 123/295 |
| 5,749,334 A | | 5/1998 | Oda et al. .................... 123/305 |
| 5,878,712 A | * | 3/1999 | Wolters et al. ............... 123/308 |
| 5,918,577 A | | 7/1999 | Martelli et al. .............. 123/295 |
| 6,257,197 B1 | * | 7/2001 | Nishimura et al. .......... 123/295 |
| 6,330,510 B1 | * | 12/2001 | Takaku et al. ............... 123/295 |
| 6,430,495 B1 | * | 8/2002 | Takaku et al. ............... 123/295 |
| 6,499,456 B1 | * | 12/2002 | Nogi et al. .................. 123/305 |
| 6,705,280 B1 | * | 3/2004 | Lippert ........................ 123/306 |
| 2002/0144671 A1 | * | 10/2002 | Shiraishi et al. ............ 123/301 |
| 2003/0075141 A1 | * | 4/2003 | Ohta et al. .................. 123/301 |

FOREIGN PATENT DOCUMENTS

| DE | 4437947 | | 4/1996 |
| DE | 19853375 | | 6/1999 |
| DE | 19818596 | | 11/1999 |
| DE | 19852552 | | 5/2000 |
| DE | 19952093 | | 8/2000 |
| EP | 000560991 A1 | * | 9/1993 |
| EP | 000580389 A1 | * | 1/1994 |
| EP | 0897741 | | 2/1999 |
| FR | 2703107 | | 9/1994 |
| GB | 2317644 | | 4/1998 |
| GB | 2328975 | | 3/1999 |

OTHER PUBLICATIONS

European International Search Report, Dec. 14, 2000.

\* cited by examiner

*Primary Examiner*—Erick Solis
(74) *Attorney, Agent, or Firm*—Baker Botts L.L.P.

(57) ABSTRACT

A direct injection internal combustion engine, especially an Otto engine, is provided with layered lean operation and internal exhaust-gas recirculation. An exhaust-gas aftertreatment for reducing Nox using an Nox storage catalyst is also provided. This combination is to achieve the highest possible exhaust-gas recirculation rates with the lowest HC and Nox emission values. A tumble flow is provided for the incoming fresh gases, which may contain recirculated exhaust gas from external exhaust-gas recirculation. The swirl axis of the incoming fresh gases therefore extends substantially crosswise to the piston movement. This results in an emissions-reducing, optimal mixture inside the cylinder during the layered lean operation.

14 Claims, 4 Drawing Sheets

DIRECT INJECTION INTERNAL COMBUSTION ENGINE WITH NOX-REDUCED EMISSIONS

BACKGROUND OF THE INVENTION

The invention relates to a direct injection internal combustion engine.

EP 0,560,991 B and EP 0,580,389 B disclose means for NOx reduction in internal combustion engines with lean operation. The principle applied is storage of the NOx produced, especially during lean operation of the engine, in a NOx storage catalyst and release of the stored NOx with simultaneous reduction by brief rich operation of the engine. This NOx conversion is also suitable especially in direct injection internal combustion engines. The NOx conversion allows relatively high conversion rates to be obtained where, especially for avoidance of raw NOx emissions, exhaust-gas recirculation may be used in combination with the NOx storage catalyst.

Exhaust-gas recirculation reduces raw NOx emissions. This measure is especially important in direct injection Otto engines with a NOx-reducing exhaust-gas aftertreatment system in lean operation, in particular NOx storage catalysts, since the lean conversion may break down very high raw NOx emissions, as occur particularly in homogeneous lean operation at lambda=1.1 to 1.4 or also in layered lean operation at lambda=1.6 to 4, even with the use of NOx storage catalysts, possibly as a result of inhibition of diffusion at the surface of the storage catalyst.

In addition, the recirculated exhaust gas leads to retardation in combustion, which, owing to the reduced temperature of combustion, also acts to reduce NOx and produces an improvement in fuel consumption, since the effective position of fuel conversion, which in direct injection Otto engines in layered lean operation typically is too early in the cycle, is shifted in the direction of the optimal position.

In addition, the hot recirculated exhaust gas, with suitable metering, may also lead to the stabilization of combustion in layered lean operation, since mixture formation, which must proceed on very small time scales owing to late injection in this type of operation, is supported by the increased temperature of exhaust-gas recirculation.

However, the portion of recirculated exhaust gas in the combustion chamber should not be too high, in order to provide enough fresh gas for the combustion of fuel. When exhaust-gas recirculation rates are too high, incomplete combustion takes place, owing to which fuel consumption and HC/CO emissions increase and the quietness of operation of the engine decreases.

The external exhaust-gas recirculation usually carried out, i.e., tapping of exhaust gas after the combustion chamber, in particular at the exhaust-gas manifold, and return to the intake side of the engine, permits homogeneous distribution of the exhaust gas to the individual cylinders by structural means only at great cost. In addition, the exhaust-gas recirculation rate in the dynamic operation present in an internal combustion engine, due to the time delay in the exhaust-gas recirculation line and the intake volume and the changing pressure conditions in the intake and exhaust-gas sides, is hard to adapt and adjust to desired specifications. Accordingly, the exhaust-gas recirculation rate may vary considerably among individual cylinders and a drop below undesired minimal values or exceeding undesired maximum values cannot be ruled out.

Alternatively or in addition to external exhaust-gas recirculation, internal exhaust-gas recirculation is well known, in which due to displacement of intake and exhaust times with respect to each other by displacement of intake camshafts in the direction of "EARLY", retention of a residual gas portion in the cylinder is made possible. The advantage of this method is that, in addition to accurate distribution to individual cylinders, the residual gas already participates in the next combustion operation and the dead times described above, and the large deviations from a desired specification, largely disappear. Because of the high temperature of the internally recirculated exhaust gas, the influence on mixture formation is also more definite and can be used more selectively.

The advantages described of internal exhaust-gas recirculation are utilized in the first direct injection DI Otto engines found on the market, which in addition to external exhaust-gas recirculation also have internal exhaust-gas recirculation with intake camshaft displacement and exhaust-gas purification by means of NOx storage catalysts. For mixture formation in these internal combustion engines, a swirl concept is used for charging, in which a rotational movement is imparted to the drawn-in gases in the cylinder, the axis of rotation running approximately parallel to the piston movement/cylinder axis. At the same time, a stationary swirl is produced in the combustion chamber, into which the stream of fuel is injected and conveyed to the spark plug. In conjunction with a NOx storage catalyst, such combustion processes already have quite low NOx emissions.

The object of the present invention is to optimize, in a direct injection internal combustion engine with NOx-reducing exhaust-gas aftertreatment, the course of combustion together with exhaust-gas aftertreatment so that especially low NOx emission values are obtained.

SUMMARY OF THE INVENTION

According to the invention, a special combination of individual exhaust gas-reducing steps allows an especially low emission of pollutants, particularly of NOx, to be obtained, so that now very low exhaust gas standards, such as for example D4, can be achieved even in direct injection internal combustion engines. This is made possible in a direct injection internal combustion engine by internal exhaust-gas recirculation (EGR), in particular in combination with external EGR, NOx-reducing exhaust-gas aftertreatment as well as a swirling movement of the incoming (fresh) gases, which runs substantially transverse to the axis of piston movement. Preferably, a tumble movement of the incoming gases is provided, which advantageously is produced by a tumble plate in the intake channel. In such a tumble movement, the incoming gases tumble rolling into the cylinder interior, the rolling movement proceeding about an axis transverse to the piston movement. The tumble plate advantageously is used with an as-needed switch from flow with tumble swirl to ordinary filling of the cylinder chamber, as is customary in for example lambda-1 operation (regeneration of storage catalyst, high engine load).

The combination of internal EGR with external EGR permits an increase in the exhaust-gas recirculation rate, so that the engine can operate with very low excess oxygen. Here, it is additionally possible to cool external EGR by means of an exhaust-gas recirculation cooler, so that the combustion chamber temperature does not get too high. External EGR is usually controlled by means of a valve.

According to the invention, the swirl axis preferably lies in a region of ±15° of the piston movement, the lowest NOx emissions being produced in this region.

In particular, according to the invention a NOx storage catalyst, which stores the nitrogen oxides of the raw exhaust-gas emissions for several seconds (usually for up to about 2 min.) as for example barium nitrate, and is regenerated with reduction during operation at lambda 1 (or alternatively a little for lambda=1), is used for NOx-reducing exhaust-gas aftertreatment. Such storage catalysts are disclosed in the European patents mentioned above.

With the present invention, a NOx sensor after the NOx-reducing step of exhaust-gas aftertreatment, may be used especially favorably, in particular in conjunction with a storage catalyst. In previous operating systems without the tumble movement, slight excess NOx emissions were possible, which were incorrectly evaluated by the NOx sensor as indicating that the storage catalyst needed to be regenerated, so that fuel consumption-increasing regeneration took place more than needed. NOx peaks are avoided by the use of the tumble gas movement, so that the NOx sensor after the storage catalyst signals permissible storage rates and hence storage-fill condition of the NOx storage catalyst only.

It has been found according to the invention that for optimal NOx reduction, as thorough as possible intermixing of the recirculated waste gas with fresh air should be obtained, since only in this way can the oxygen molecules participating in NOx formation be partially replaced by inert gas (exhaust gas) in the whole combustion chamber. According to the invention, production of rapidly burning local zones with a high percentage of oxygen, which contribute dis-proportionately to NOx formation, are avoided. This is of importance especially in the direct injection Otto engine, in order to be able to realize the advantages of internal exhaust-gas recirculation as much as possible.

The invention will be described in detail by means of an example.

DESCRIPTION OF THE INVENTION

Figure 1:
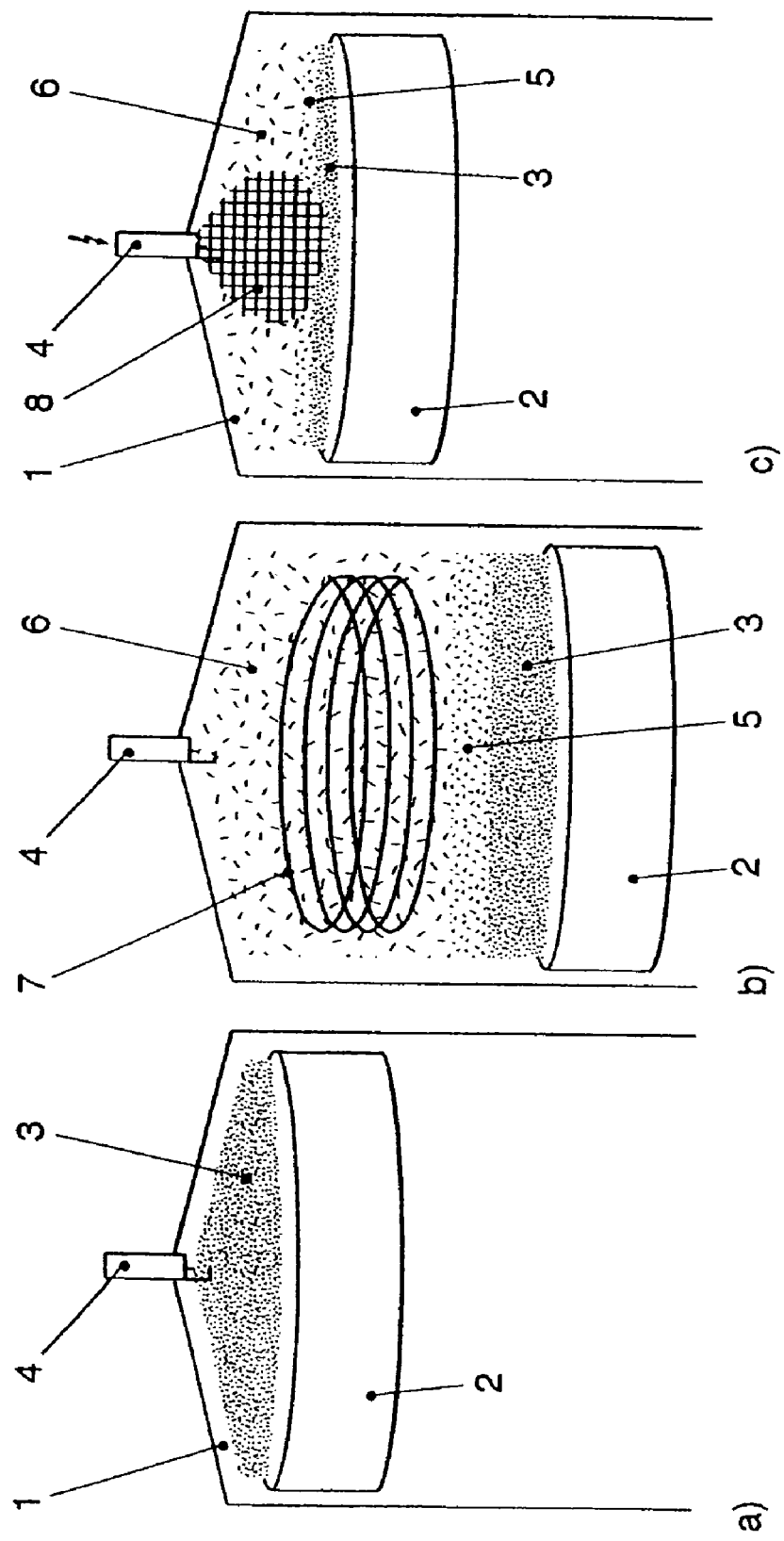
FIG. 1 shows a combustion course according to the prior art (swirl concept).

Studies according to the invention have shown that the mixture of fresh air 6 with exhaust gas 3 of internal exhaust-gas recirculation remaining in the combustion chamber 1 (FIG. 1a, piston 2 is at the top, exhaust gas 3 remains in the combustion chamber 1 owing to simultaneously open intake and exhaust valves (FIG. 4)) is suboptimal with swirl turbulence 7 wherein the swirl axis is aligned substantially to the axis of piston movement. The residual gas 3 of the internal EGR remains in the vicinity of the piston floor during the intake and compression strokes (FIG. 1b/c), due to the action of the swirl flow 7, the fresh gas 3 drawn in (containing predominantly fresh air) is then layered over the residual gas 3 in the intake stroke (FIG. 1b, piston 2 travels downward). Since the swirling gas movement 7 has only a few pulses in the direction of the piston movement, this layering (without substantial intermixing) is largely maintained during compression (FIG. 1c, piston travels upward). The fuel 8 injected toward the end of compression (injection nozzle not shown) is injected partly into almost pure fresh air 6, partly into inhomogeneous mixed zones 5 with varying fresh air-residual gas proportions, and partly into almost pure residual gas 3 (FIG. 1c). During conversion (ignited by spark plug 4), residual gas portions varying from near 0% to near 100% may thus appear in the flame front, the almost optimal residual gas portion being present locally only in small regions of the combustion chamber 1, although the overall portion of residual gas may correspond to the desired specifications. In zones with no or little residual gas, the fuel burns rapidly and at high temperatures, so that no signifcant NOx reduction occurs. In zones with a very high percentage of residual gas, fuel conversion breaks down, so that the exhaust gas, in addition to having only small NOx reduction, may show elevated HC emissions and a reduction in work delivered. In addition, increased fuel consumption as well as noisy operation may occur, leading to a drop in the desired specification for the exhaust-gas recirculation rate, and hence, decreased NOx-reduction potential. Although in principle it is also possible to take this layering into account in the swirl movement, by for example designing the floor of the piston so that either swirling commences again on compression or the injected stream reaches as homogeneous as possible a region, according to the invention it has been discovered that providing a tumble swirl permits better, i.e., lower NOx emission values, to be obtained, especially in conjunction with a NOx sensor.

Depending on exhaust-gas concept, the resulting high HC and NOx emissions can be reduced, particularly by selective catalytic reduction, i.e., reciprocal reduction and oxidation, so that on the whole relatively low exhaust-gas emission values can again be achieved, but only at the expense of fuel consumption and quietness of operation of the engine.

Figure 2:
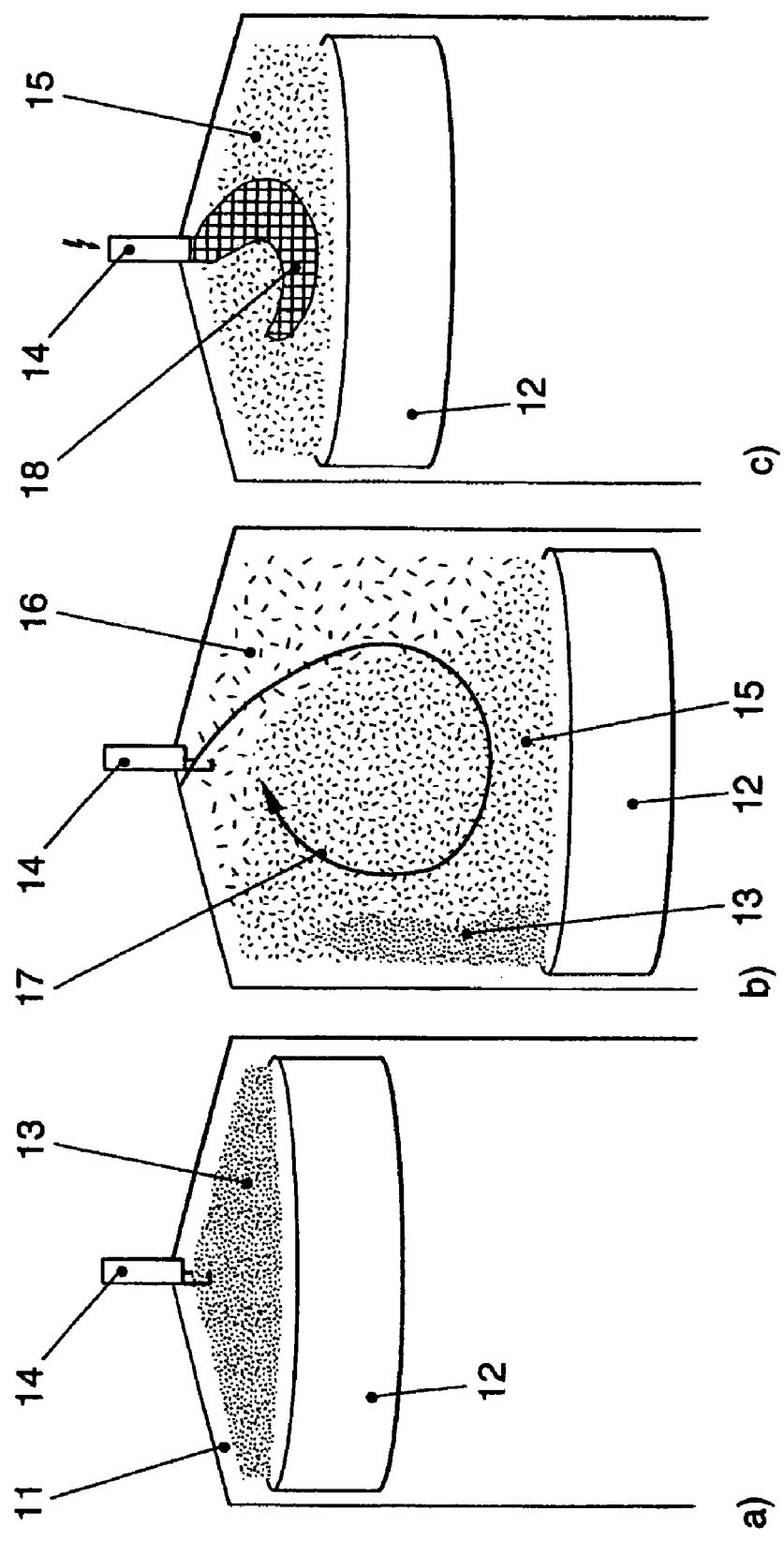
FIG. 2 shows the combustion course (tumble concept) according to the invention.

As shown in FIG. 2, according to the invention internal exhaust-gas recirculation also takes place (as in FIG. 1) via displacement of the intake camshaft but with a tumble charging movement concept 17, wherein the axis of rotation of the drawn-in gas lies largely transverse to the piston movement. At the beginning of the intake stroke (FIG. 2a, piston 12 is at the top), a high residual gas portion 13, as in FIG. 1a, is found in the cylinder chamber 11. However, in contrast to the prior art, the method according to the invention has the advantage that the subsequent charging movement (FIG. 2b) results in intensive intermixing of the residual exhaust-gas portion 13 with the fresh gas 16 drawn in (optionally enriched with exhaust gas owing to external exhaust-gas recirculation). As can be seen in FIG. 2c, the injected fuel 18 thus encounters a gas mixture whose local residual gas portion differs only slightly from the average (overall) residual gas portion (largely homogeneous mixture 15). This prevents extinction of the flame (ignited via spark plug 14) because of excess local residual exhaust-gas portions, and leads to ideal NOx reduction in the raw exhaust gas without increasing HC emissions, with low operation noise and low fuel consumption. As a result, a higher proportion for the residual exhaust gas content of the charge may be used.

Figure 3:
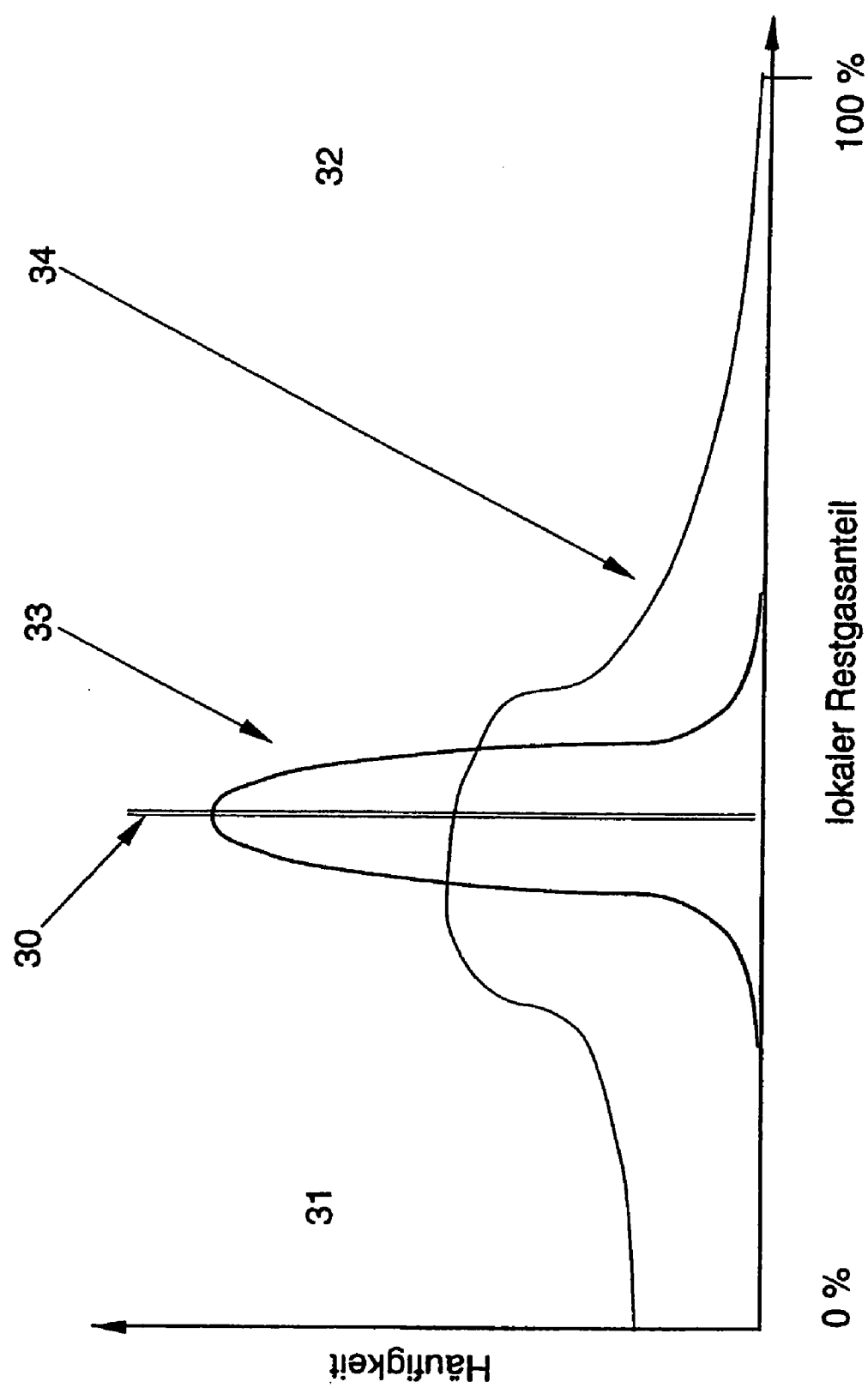
FIG. 3 is a graphic representation of the two concepts.

FIG. 3 is a graph showing the small variation of the residual exhaust-gas content in the combustion chamber. The overall residual exhaust-gas portion in the combustion chamber is labeled 30.

31 indicates the undesired region of too little NOx reduction (too much $O_2$); 32 shows the undesired region of deficient fuel conversion (higher CO/HC production). Curve 33 represents the tumble concept; curve 34 shows greater non-homogeneity from the swirl concept. According to the invention, even at a high exhaust-gas recirculation rate, local excess of the maximum permissible residual exhaust-gas portion is largely avoided in the tumble concept.

Figure 4:
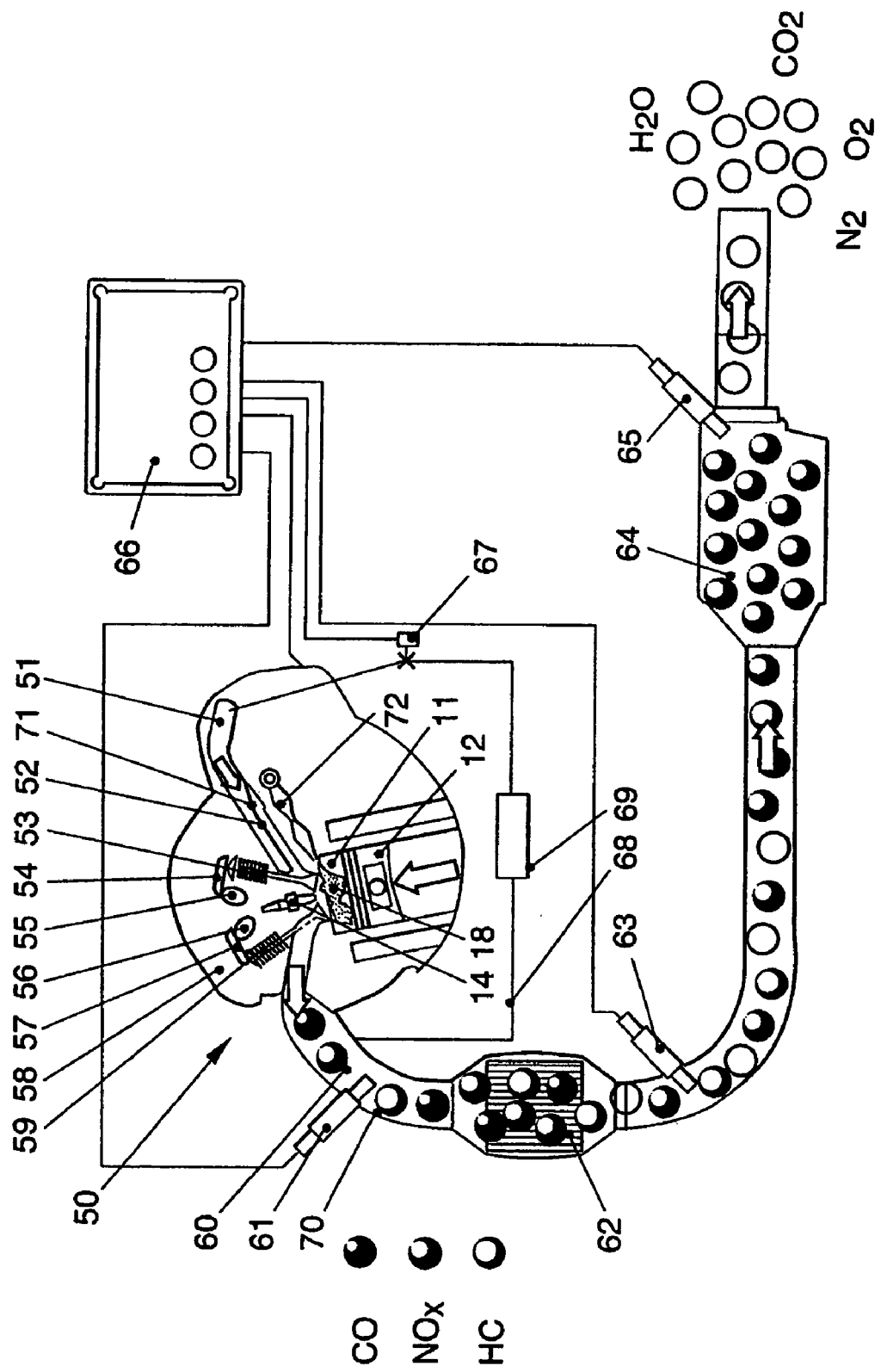
FIG. 4 is a general representation of the an engine system according to the invention.

The general concept is represented in FIG. 4, which shows a section in the internal combustion engine 50, which has a gas inlet 51, through which, in layer-charging operation, the incoming fresh gases, together with exhaust gases recirculated via an exhaust-gas recirculation line 68, have passed into the combustion cylinder 11 in a tumble flow 17, via a tumble plate 52. The re-circulated exhaust gases are controlled via a valve 67 by the engine control 66 according to operating conditions and in addition are cooled via an EGR cooler 69. As in FIG. 2c, the compression stroke, in which the fuel 18 is injected, is represented. The engine 50 additionally has an intake camshaft 55 and an exhaust camshaft 56, which via levers 54 and 57 actuate the intake valves 53 and exhaust valves 59. The latter are accommodated in the cylinder head 58. Filling of the combustion chamber 11 with exhaust gas 13 is obtained by opening of the valves 53 and 59 (FIG. 2a). The valves 53 and 59 are closed during the compression stroke.

After combustion has taken place, the piston 12 again travels downward and the exhaust valves 59 are opened, so that the exhaust gases 60 flow into the exhaust manifold 70. In doing so, they flow past a lambda probe 61, which is designed as a broadband lambda probe and serves for determination of the lambda value from rich to lean. The exhaust gases then flow through a preliminary catalyst 62, which is designed as a 3-way catalyst. Here, CO and HC are converted to $CO_2$ and $H_2O$ by the oxygen present, and, in addition, oxidation from NO to $NO_2$ takes place. A temperature sensor 63, which serves for monitoring (OBD) of the catalyst 62, is arranged after the preliminary catalyst 62. In the further course, the exhaust gases flow into a NOx storage catalyst 64, which absorbs the nitrogen oxides. With increasing degree of fill, increased NOx passes through the NOx storage catalyst 64 and is detected by the NOx sensor 65. This signal is assessed by the engine control 66 as meaning that, when a given value is exceeded, regeneration of the NOx storage catalyst 64 should take place. This is done by brief (up to about 5 sec.) rich operation of the engine 50, during which increased levels of $H_2$, CO and HC enter the NOx storage catalyst 64 and react with the stored NOx to form $N_2$, $H_2O$ and $CO_2$. Following regeneration, engine operation is switched back to lean operation.

Regeneration as well as high-load operation advantageously are carried out under homogeneous operating conditions of the engine 50, in which the oncoming flow 71 from the tumble plate 52 is flattened (laid on the wall of the intake channel 51), so that the fresh gases flow past the tumble plate 52 and as a result no tumble swirl takes place in the combustion chamber 11.

In a direct injection internal combustion engine, especially an Otto engine, with layered lean operation and internal exhaust-gas recirculation, NOx-reducing exhaust-gas aftertreatment is provided by means of a NOx storage catalyst. To obtain as high as possible exhaust-gas recirculation rates with as low as possible HC and NOx emission values, a tumble flow is provided for the incoming fresh gases, which optionally may contain recirculated exhaust gas from external exhaust-gas recirculation, so that the swirl axis of the incoming fresh gases runs substantially transverse to the piston movement. In this way, an optimal emission-reducing mixture of the internal chamber of the cylinder is obtained in layered lean operation.

While there have been described what are believed to be the preferred embodiments of the invention those skilled in the art will recognize that other changes and modifications may be made thereto without departing from the spirit of the invention, and it is intended to claim all such changes and modifications as fall within the true scope of the invention.

What is claimed is:

1. A direct injection internal combustion engine system, comprising:
   at least one cylinder having a piston moving along an axis;
   a gas inlet and a gas outlet leading to an exhaust passage;
   an $No_x$ reducing converter in said exhaust passage; and
   intake and exhaust valves associated with said cylinder and said gas inlet and gas outlet, arranged to provide internal exhaust-gas recirculation;
   wherein said cylinder, said gas inlet and said gas outlet are arranged to provide layered lean operation of said engine; and
   wherein said inlet passage is arranged to provide a tumble movement in incoming gas having a swirl axis substantially transverse to said piston axis in such a way that a subsequent charging movement of the piston causes an intermixture of residual exhaust gas with said incoming gas.

2. Internal combustion engine according to claim 1 wherein a tumble plate is provided in said gas inlet.

3. Internal combustion engine according to claim 1 wherein said engine is an Otto engine.

4. Internal combustion engine according to claim 1 wherein said-passage is arranged for a layered charging.

5. Internal combustion engine according to claim 1 wherein there is further provided an arrangement for external exhaust-gas recirculation.

6. Internal combustion engine according to claim 5, wherein the external exhaust-gas recirculation arrangement includes an arrangement for cooling recirculated gases.

7. Internal combustion engine according to claim 5, wherein the external exhaust-gas recirculation arrangement includes a control valve.

8. Internal combustion engine according to claim 1 wherein the stumble movement has an axis which lies in the region of 75° to 105° of said piston axis.

9. Internal combustion engine according to claim 1 wherein said reducing converter comprises a NOx storage catalyst.

10. Internal combustion engine according to claim 9 wherein said storage catalyst is controlled by a NOx sensor.

11. Internal combustion engine according to claim 1 wherein there is provided an arrangement for controlling internal exhaust-gas recirculation by adjustment of intake valve opening times in the direction of early.

12. A direct injection internal combustion engine system, comprising:
   at least one cylinder having a piston moving along an axis;
   a gas inlet and a gas outlet leading to an exhaust passage;
   a preliminary $No_x$ catalyst in said exhaust passage followed downstream by an $No_x$ storage catalyst;
   an external exhaust-gas recirculation line comprising an exhaust-gas cooler and a control valve wherein said exhaust-gas recirculation line couples said gas outlet with said gas inlet;
   a lambda probe arranged between said gas outlet and said preliminary $No_x$ catalyst;
   a temperature sensor arranged between said preliminary $No_x$ catalyst and said $No_x$ storage catalyst;
   a $No_x$ sensor arranged downstream said $No_x$ storage catalyst; and intake and exhaust valves associated with said cylinder and said gas inlet and gas outlet, arranged to provide internal exhaust-gas recirculation;

wherein said cylinder, said gas inlet and said gas outlet are arranged to provide layered lean operation of said engine;

wherein said inlet passage is arranged to provide a tumble movement in incoming gas having a swirl axis substantially transverse to said piston axis in such a way that a subsequent charging movement of the piston causes an intermixture of residual exhaust gas with said incoming gas; and wherein the system further comprises a control unit receiving signals from said sensors and said probe for controlling said direct injection and said intermixture.

13. A direct injection internal combustion engine system, comprising:

at least one cylinder having a piston moving along an axis;

a gas inlet channel and a gas outlet leading to an exhaust passage;

an $No_x$ reducing converter in said exhaust passage; and intake and exhaust valves associated with said cylinder and said gas inlet channel and gas outlet, arranged to provide internal exhaust-gas recirculation;

wherein said cylinder, said gas inlet channel and said gas outlet are arranged to provide layered lean operation of said engine; and wherein said inlet channel comprises a controllable tumble plate which can be laid against a wall of said inlet channel to allow incoming gas to pass by or can be set to provide a tumble movement in incoming gas having a swirl axis substantially transverse to said piston axis and arranged to cause an intermixture of residual exhaust gas with said incoming gas.

14. A direct injection internal combustion engine system, comprising:

at least one cylinder having a piston moving along an axis;

a gas inlet channel and a gas outlet leading to an exhaust passage;

a preliminary $No_x$ catalyst in said exhaust passage followed downstream by an $No_x$ storage catalyst;

an external exhaust-gas recirculation line comprising an exhaust-gas cooler and a control valve wherein said exhaust-gas recirculation line couples said gas outlet with said gas inlet channel;

a lambda probe arranged between said gas outlet and said preliminary $No_x$ catalyst;

a temperature sensor arranged between said preliminary $No_x$ catalyst and said $No_x$ storage catalyst;

a $No_x$ sensor arranged downstream said $No_x$ storage catalyst; and intake and exhaust valves associated with said cylinder and said gas inlet channel and gas outlet, arranged to provide internal exhaust-gas recirculation;

wherein said cylinder, said gas inlet channel and said gas outlet are arranged to provide layered lean operation of said engine;

wherein said inlet channel comprises a controllable tumble plate which can be laid against a wall of said inlet channel to allow incoming gas to pass by or can be set to provide a tumble movement in incoming gas having a swirl axis substantially transverse to said piston axis and arranged to cause an intermixture of residual exhaust gas with said incoming gas; and wherein the system further comprises a control unit receiving signals from said sensors and said probe for controlling said direct injection and said intermixture.

* * * * *